May 2, 1939.  J. DUGGAN  2,156,722
ELECTRIC CIRCUIT CONTROLLING DEVICE
Filed July 21, 1937    3 Sheets-Sheet 1
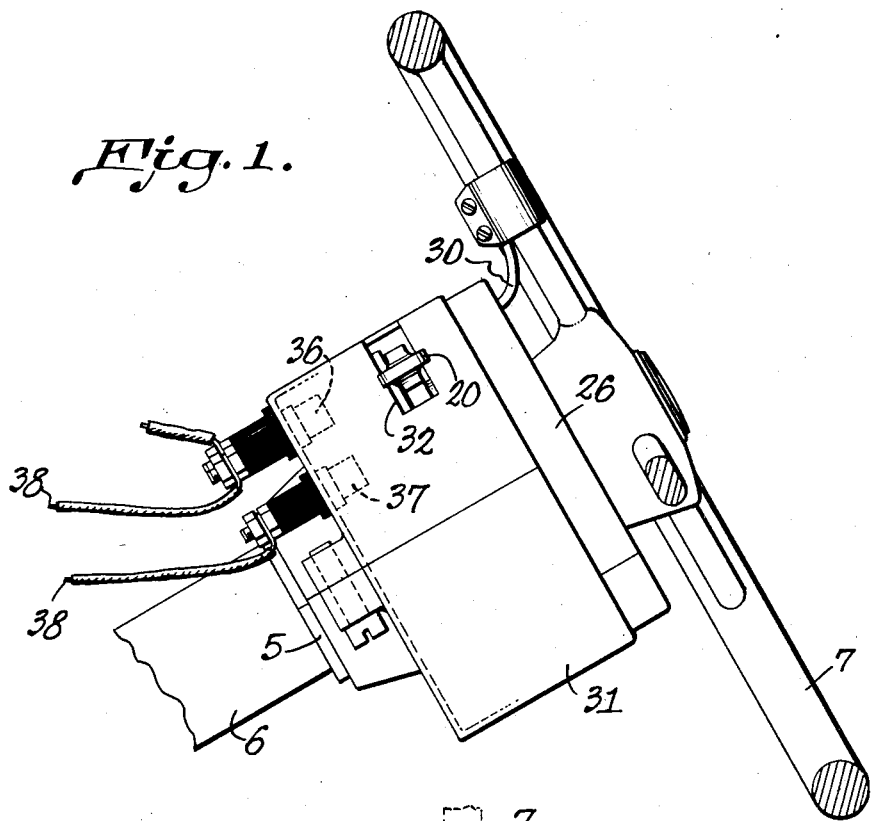
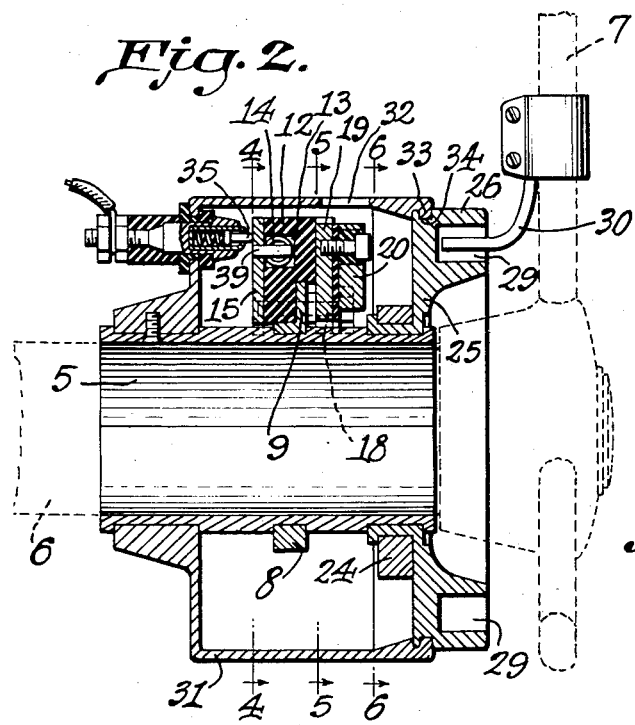
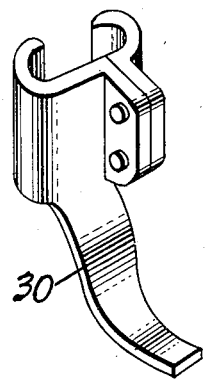
James Duggan
INVENTOR.
BY C. A. Snow & Co.
ATTORNEYS.

May 2, 1939.　　　　　J. DUGGAN　　　　　2,156,722
ELECTRIC CIRCUIT CONTROLLING DEVICE
Filed July 21, 1937　　　3 Sheets-Sheet 2
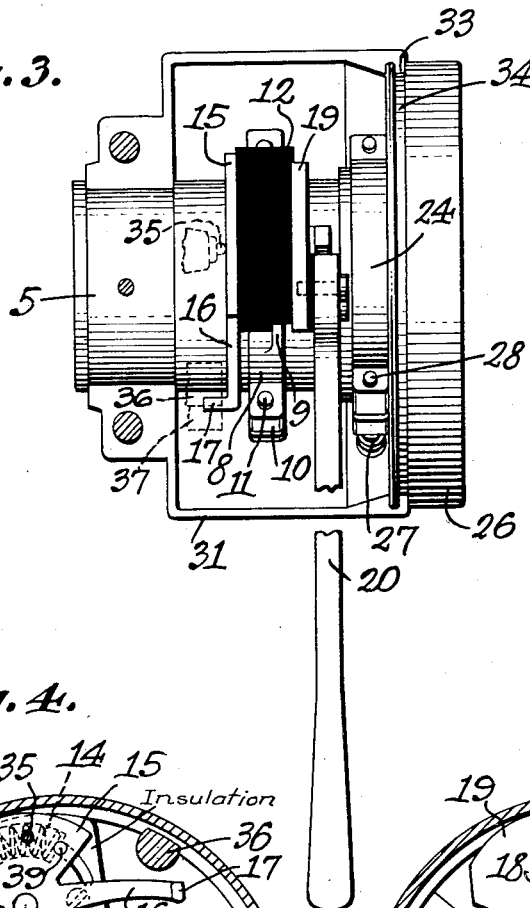
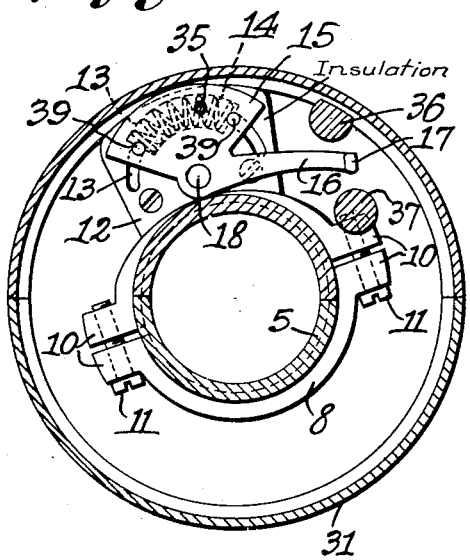
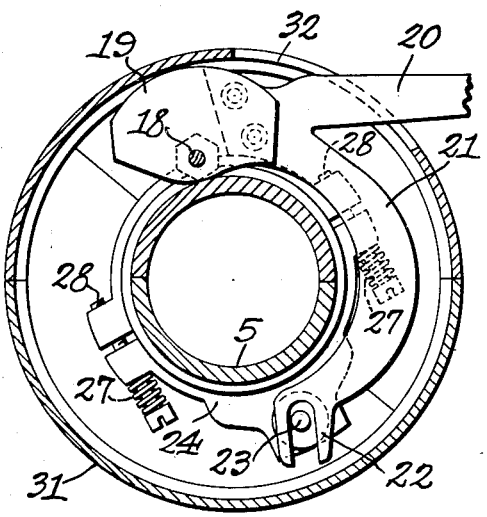
James Duggan
INVENTOR.
BY *C. A. Snowles*
ATTORNEYS.

May 2, 1939.  J. DUGGAN  2,156,722

ELECTRIC CIRCUIT CONTROLLING DEVICE

Filed July 21, 1937  3 Sheets-Sheet 3

James Duggan
INVENTOR.

BY C. A. Snow & Co.

ATTORNEYS.

Patented May 2, 1939

2,156,722

UNITED STATES PATENT OFFICE 2,156,722

ELECTRIC CIRCUIT CONTROLLING DEVICE

James Duggan, Melrose, Iowa

Application July 21, 1937, Serial No. 154,890

2 Claims. (Cl. 200—59)

This invention relates to a circuit controlling device especially designed for controlling electric signal, wherein signals are displayed to indicate the direction of travel to be taken by the vehicle.

The primary object of the invention is to provide a circuit controlling device of this character including a control switch mounted on the steering post of the vehicle, and constructed in such a way that the circuit to signal lights may be completed by the operation of a manually controlled switch, or automatically, in the event that the operator fails to move the lever to operate a signal.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is an elevational view of a device constructed in accordance with the invention, and showing the device as mounted on a steering post adjacent to the steering wheel.

Figure 2 is a longitudinal sectional view through the device as mounted on a steering post.

Figure 3 is a side elevational view of the device, one of the sections of the casing having been removed.

Figure 4 is a sectional view taken on line 4—4 of Figure 2.

Figure 5 is a sectional view taken on line 5—5 of Figure 2.

Figure 10 is a perspective view of the arm which is secured to one of the spokes of the vehicle, and which cooperates with the operating ring shown by Figure 7 of the drawings.

Figure 6:
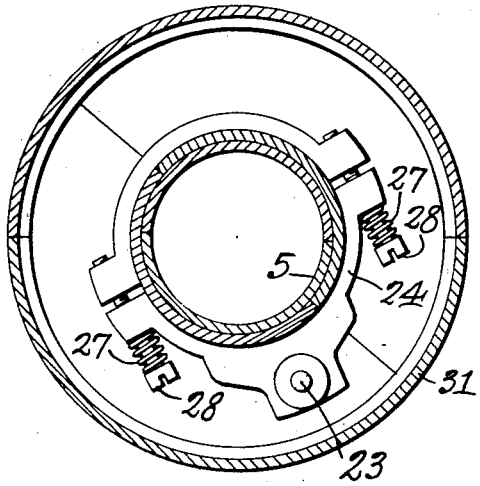
Figure 6 is a sectional view taken on line 6—6 of Figure 2.

Referring to the drawings in detail, the reference character 5 designates a split tubular bushing adapted to be secured around a steering post such as indicated at 6, and at a point directly under the steering wheel, indicated in the present showing by the reference character 7.

As clearly shown by the drawings, the tubular bushing 5, is formed with an annular groove designed to accommodate the split collar 8 which is formed with a flange 9, extending laterally therefrom. The split collar 8 is provided with extensions 10 through which the screws 11 extend, the screws acting to secure the collar in position on the bushing. Secured to the flange 9, is a block of insulating material indicated by the reference character 12, the block of insulating material 12 being formed with an arcuate shaped slot 13, in which the coiled spring 14 is mounted.

Disposed under the block of insulating material 12, is a contact plate indicated by the reference character 15, which is provided with an arm 16 formed with a right angled end portion 17 defining a contact point, to be hereinafter more fully described. A shaft indicated by the reference character 18 extends upwardly from the contact plate 15, and connects with the plate 19. Secured to the plate 19, is the operating lever 20 which is of a length to extend to a position adjacent to the rim portion of the steering wheel, so that a person gripping the steering wheel, will have easy access to the operating lever.

Forming a part of the operating lever 20, is a curved arm 21 that has a forked end portion 22 that engages the pin 23 depending from the operating ring 24 that in turn is secured to the depending annular flange 25 of the control ring 26, the operating ring 24 being secured in position to grip the depending flange 25, by means of the coiled springs 27 that are mounted on the bolts 28 which in turn extend through openings of the operating ring. Thus it will be seen that due to this construction, the springs 27 will urge the sections of the operating ring into close engagement with the depending flange, so that the operating ring will move with the control ring, under normal conditions.

Figure 7:
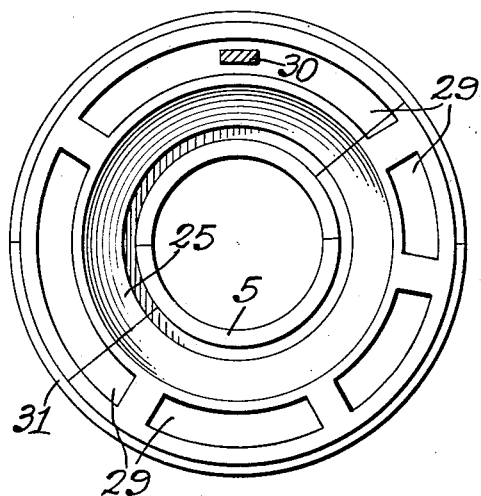
Figure 7 is a view of the operating ring member, forming a part of the device.
Figure 8:
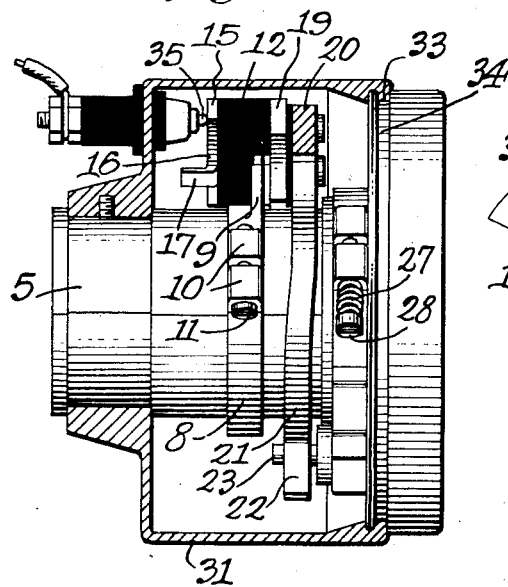
Figure 8 is a sectional view through the casing of the device, illustrating the mechanism in elevation.
Figure 9:
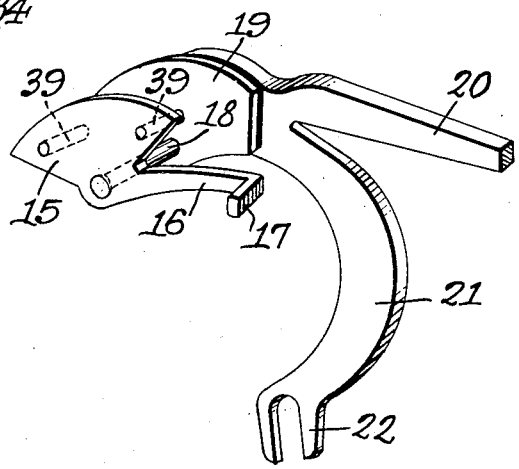
Figure 9 is a perspective view of the control lever of the device.

As clearly shown by Figure 7 of the drawings, this control ring 26 is provided with a plurality of openings 29, the openings being of various lengths. These openings are designed to accommodate the arm 30 that is adapted to be secured to one of the spokes of the steering wheel, in a manner as shown by Figure 1 of the drawings, the free end of the arm passing into one of the openings 29, so that when the steering wheel is rotated, the free end of the arm 39 will contact with the end walls of the openings 29 in which the arm is disposed, causing the control ring and operating ring to move therewith. This operating means is used for automatically controlling the operation of the device, in the event that the operator neglects to operate the lever 20.

The reference character 31 designates the sectional housing adapted to house the complete construction, and as shown, one of the sections of the housing is formed with curved slot 32 through which the operating lever 20 extends. An annular flange 33 is formed at the upper end of the housing, and fits within the annular groove 34 of the control ring 26, securing the sectional housing in position. The reference character 35 designates a contact point that rubs the contact plate 15, so that the electric energy passing through the contact point, from a suitable source of electricity supply, will be directed to the contact plate 15 and arm 16, formed integral therewith. A contact pin indicated by the reference character 36 extends into the housing 31, and is disposed in the path of travel of the end portion 17 of the arm 16 when the arm is moved in one direction. Another contact pin indicated by the reference character 37 extends into the housing, and is arranged adjacent to the contact pin 36, and this contact pin 37 is also within the path of travel of the end portion 17 of the arm 16, when the arm 16 is moved in the opposite direction. Thus it will be seen that as the end portion 17 of the arm 16 contacts with either of the contact pins 36 or 37, a circuit will be completed. Wires 38 connect with contact pins 36 and 37, and extend to suitable indicating devices which may be in the form of illuminated arrows or other suitable means.

Should the operator of a vehicle equipped with the device forming the subject matter of this invention, intend to make a right hand turn, the operator will move the lever 20, causing the end portion 17 of the arm 16, to contact with the contact pins 36 or 37, connected with the direction indicator to be operated. It is obvious that when the lever 20 is released, the coiled spring 14 will operate to move the plate 15 to its neutral position. Pins 39 are carried by the contact plate 15, and engage the ends of the coiled spring to cause this movement of the plate and arm connected therewith.

If the operator of the vehicle neglects to move the operating lever 20, the arm 30 moving with the steering wheel, will operate to move the control ring 26 that in turn transmits movement to the operating ring 24, to accomplish the purpose of the invention.

It is believed that in view of the foregoing detail description a further description as to the operation of the device is unnecessary.

Having thus described the invention, what is claimed is:

1. An electric switch adapted to be secured to a steering wheel post under the steering wheel thereof, comprising a bushing fitted around the post, a switch housing secured to the bushing, stationary contacts within the housing, a rotary controlled ring mounted on the bushing and movable with the steering wheel, said control ring having a flange, an operating ring embodying split ring sections, mounted on the flange and normally held on the flange by frictional contact therewith, a contact arm on the operating ring and adapted to engage either of said contact members completing a circuit, means for automatically returning the operating ring to its inactive position, and manually controlled means for moving the operating ring to complete a circuit independently of the steering wheel.

2. An electric switch adapted to be secured to a steering wheel post under the steering wheel thereof, comprising a housing, spaced contact members in the housing, an operating ring having elongated openings, mounted in one end of the housing, a control ring frictionally held on the operating ring, a contact arm on said control ring and adapted to engage either contact member completing a circuit as the steering wheel is rotated, an operating arm for moving the control ring to complete a circuit independently of the steering wheel, and an arm secured to a spoke of a steering wheel and extended into one of the elongated openings of the operating ring for moving the control ring and contact arm with the steering wheel, to complete a circuit.

JAMES DUGGAN.